(12) United States Patent
Bryant

(10) Patent No.: US 6,279,771 B1
(45) Date of Patent: *Aug. 28, 2001

(54) VESSEL WITH IMPROVED FOOD SUPPORT SURFACE

(75) Inventor: Willie Bryant, Terre Haute, IN (US)

(73) Assignee: Doughmakers, L.L.C., Terre Haute, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,900

(22) Filed: Aug. 15, 1997

(51) Int. Cl.[7] .................................................. A47J 37/00
(52) U.S. Cl. ........................ 220/573.1; 220/912; 220/608; 99/422
(58) Field of Search .................................... 220/571, 572, 220/573.1, 912, 572.3, 572.2; 99/422, 425, 444

(56) References Cited

U.S. PATENT DOCUMENTS

| | | | | |
|---|---|---|---|---|
| 1,045,290 | * | 11/1912 | Holbert | 220/572 |
| 2,186,365 | * | 1/1940 | Castles | 220/572 |
| 2,257,468 | | 9/1941 | Langel | 53/6 |
| 2,618,258 | | 11/1952 | Kroyer | 126/390 |
| 2,673,003 | * | 3/1954 | Stewart | 220/573.1 |
| 3,367,529 | * | 2/1968 | Welch et al. | 220/572 |
| 3,493,726 | | 2/1970 | Bardeau | 219/443 |
| 3,958,504 | * | 5/1976 | Levin | 220/573.1 |
| 4,078,479 | | 3/1978 | Mori | 99/422 |
| 4,123,560 | | 10/1978 | Hice | 426/509 |
| 4,533,807 | | 8/1985 | Minamida | 219/10.49 R |
| 5,176,282 | * | 1/1993 | Rapaz | 220/574 |
| 5,242,078 | * | 9/1993 | Haas et al. | 220/574 |
| 5,351,608 | | 10/1994 | Muchin et al. | 99/422 |
| 5,385,261 | * | 1/1995 | Lippisch et al. | 220/572 |
| 5,417,150 | | 5/1995 | Kordic | 99/432 |
| 5,628,426 | | 5/1997 | Doyle et al. | 220/608 |
| 5,720,930 | * | 2/1998 | Bean | 220/572 |

* cited by examiner

Primary Examiner—Joseph M. Moy
(74) Attorney, Agent, or Firm—Suelthaus & Walsh, P.C.

(57) ABSTRACT

A vessel incorporating an improved article support surface for supporting an article, such as a food product, during processing (e.g., baking, thawing or freezing), has a surface for supporting a food product or another article and a pattern is formed or otherwise incorporated in the article supporting surface. The pattern incorporated into the support surface is comprised of a raised portion and a low portion or valley and combine to define or create a pocket underneath the supported article or food product in which air circulates or flows during processing. In a preferred embodiment various shapes of baking sheets incorporating a "pebble-grain pattern" is embossed on a metal sheet and the embossed metal sheet is then formed into the desired shape. The sheets are constructed of various aluminum alloys used in the food equipment industry including, but not limited to, 3003, 3004 or 5052 aluminum alloys.

32 Claims, 2 Drawing Sheets

VESSEL WITH IMPROVED FOOD SUPPORT SURFACE

BACKGROUND OF THE INVENTION

The present invention relates in general to vessels with improved supporting surfaces for supporting articles and pertains, more particularly, to a vessel for supporting food products such as pre-baked food during the baking process. The support surface is an improvement over the conventional flat, bumpy or rippled surface found, for example, on conventional baking sheets, cookie sheets and pizza pans.

With the conventional vessel for supporting a food product or other article to be processed the vessel includes a supporting surface that supports the article over substantially all of a supported surface of the article. For example, it is common to bake cookie dough an a flat cookie sheet or bake an un-cooked pizza on a flat pizza pan.

These conventional baking pans are typically constructed using a flat, bumpy or rippled surface that provide for direct contact between the cookie dough or pizza. The direct contact between the food product being baked and the pan result in a food product that is trapped or sealed or in complete contact with the baking surface of the pan.

The result of this "trapped" effect is well-known. The food product that is trapped on the cooking surface has a tendency to burn due, at least in part, to the direct heat transfer between the cooking surface that becomes essentially the same temperature as the baking appliance, for example, an oven and the food product since they are in substantially direct contact.

Also, another drawback of trapping the food product on the baking or cooking sheet or pan is the inability to effectively brown the food product without burning the portion of the food product in contact with the baking or cooking sheet or pan. This same trapping effect can sometimes be observed in other processes related to food products, including the uneven thawing of a frozen food item or the uneven cooling of a food product or the uneven freezing of a food product when the food product is placed on a conventional flat cooking sheet.

It was previously mentioned that other surface treatments for cookie sheets, pizza pans and the like are known, and they include what has been referred to as a bumpy surface or a rippled surface. It is believed that vessels constructed so as to have these or equivalent types of surfaces will suffer all of the drawbacks previously mentioned as well as additional drawbacks related to cleaning the vessel after use, particularly after a use that results in a burned portion of the food product remaining on the cookie sheet or pizza pan or other vessel used as herein described.

Over the years embossed sheet metal has generally been used for architectural or cosmetic practical applications. There are a number of different existing patterns, such as stucco, cedar, diamond, ribbed and pebble-grain used, for example, for aluminum siding and aluminum or bright stainless steel wall panels or refrigeration panels.

These patterns, as well as the pebble-grain pattern discussed herein, are produced commercially by embossing. Generally, this is done in a rolling mill or by an outside specialty metal finisher.

Once the aluminum material has been rolled to the desired thickness, it is fed, usually in coil form, through a set of embossing rolls. These large steel rolls have the exact same pattern which is then transferred to the aluminum sheet.

By nature of the process, the pattern will repeat at intervals based on the roll diameter chosen by the embosser. The pattern may be embossed onto one or both sides.

However, the only use of an embossed sheet product using the pebble-grain pattern or any other pattern for that matter in the food service industry is a use as a serving tray. In that use a special aluminum alloy (5657) is used because it can be chemically brightened to give the food service tray a silver-plated appearance and it is not known to be used for cooking or baking.

SUMMARY OF THE INVENTION

Accordingly, it is an object of the present invention to provide a vessel for supporting an article having an improved support surface that is constructed with a pattern located on the support surface of the vessel. The pattern provides at least one air pocket between the vessel support surface and the article when the surface supports article so as to provide heat transfer between the article and the vessel.

Another object of the present invention is to provide a baking pan that is adapted to support a food product on a surface that does not trap the food product in direct contact with the baking pan. With the baking pan of this invention foods can be baked or browned with a reduced occurrence of burning and an enhanced capability to brown the food product when it is desired.

A further object of the present invention is to provide a vessel with an improved surface that is adapted to have one or more raised surfaces or portions contacting a food item or other article for maximum heat transfer between the vessel surface and the food product or other article and a low area or portion that forms pockets between the food product or other article that allow air to flow and circulate under the surface of the food item or other article supported on the improved surface.

Still another object of the present invention is to provide a cooking vessel that includes a support surface that provides improved uniform cooking of food product. The cooking support surface of this invention with its air flow and circulation characteristics slows heat transfer from the vessel to the food product while other exposed portions of the food product not in contact with the support surface approach the temperature of the cooking appliance or, in other words, "air bake" which is widely thought to be an improved method of baking.

Still a further object of the present invention is to provide a cooking vessel that includes a support surface that provides improved uniform browning of a food product. The cooking support surface of this invention with its air flow and circulation characteristics provides more uniform browning of the food product since the portion of the food product that is supported by and, thereby, resting on the patterned support surface is not "trapped" or sealed on a hot or very hot surface without any air flow or circulation since it will be recognized a "trapped" food product may burn before it browns to the desired color.

Another object of the present invention is to provide an improved article support vessel that incorporates an improved support surface pattern that need not be coated and is more readily cleaned after use (e.g., baking) than vessels with conventional surfaces. The patterned surface of the vessel provides for a flow of air between a food product and the patterned surface that "cushions" the food product in such a manner that the improved support surface acts in the manner of a non-stick surface.

A further object of the present invention is to provide an improved article support vessel that is adapted for its durability and ability to resist rust.

To accomplish the foregoing and other objects of this invention there is provided a vessel incorporating an improved article support surface for supporting an article, such as a food product, during processing (e.g., baking, thawing or freezing). The vessel comprises a surface for supporting a food product or another article and a pattern formed or otherwise incorporated in the article supporting surface.

The pattern incorporated into the support surface is comprised of a raised portion and a low portion. The raised portion and the low portion combine to define or create a pocket underneath the supported article or food product in which air circulates or flows.

In this way the article supported on the vessel incorporating the patterned surface and the aforementioned air pockets act to enhance the likelihood that heat transfer takes place through a cushion of air and not through the direct contact between the article and the vessel. The cushion of air, therefore, enhances heat transfer as in cooking, thawing and freezing to give just a few examples.

In the disclosed embodiments described herein, there are provided various shapes of baking sheets incorporating a "pebble pattern" as illustrated in the drawings. This preferred pattern is embossed on the metal sheet and the embossed metal sheet is then formed into the desired shape.

Also, in the preferred embodiment the sheets are constructed of various aluminum alloys used in the food equipment industry including, but not limited to, 3003, 3004 or 5052 aluminum alloys.

These and other objects and features of the present invention will be better understood and appreciated from the following detailed description of preferred embodiments thereof, selected for purposes of illustration and shown in the accompanying drawings.

DETAILED DESCRIPTION

Figure 1:
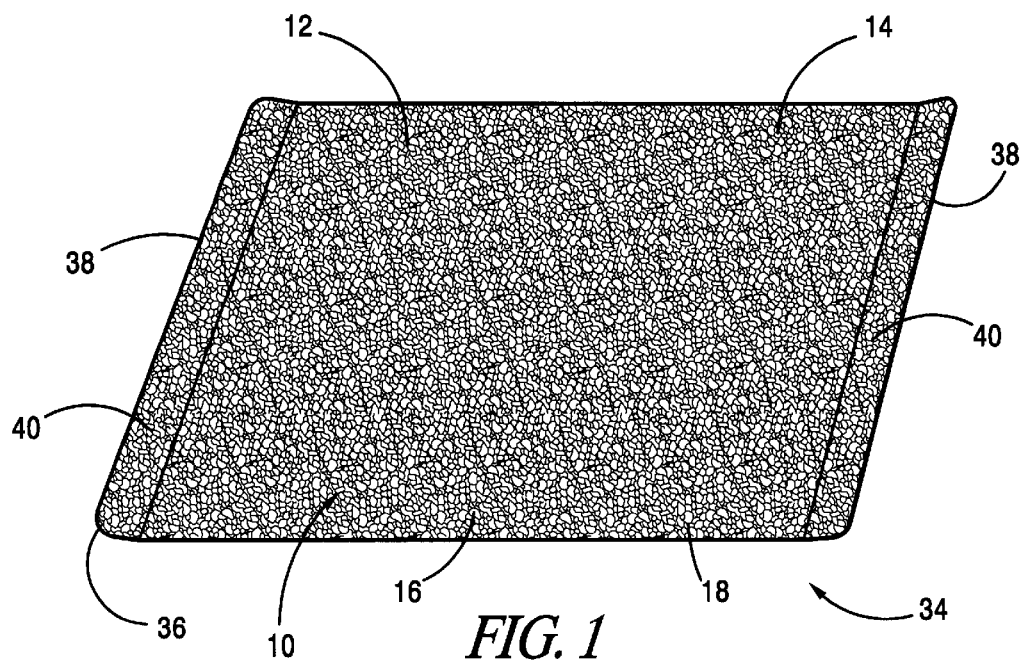
FIG. 1 is a perspective view of a vessel constructed in accordance with the present invention (from a photograph)
Figure 2:
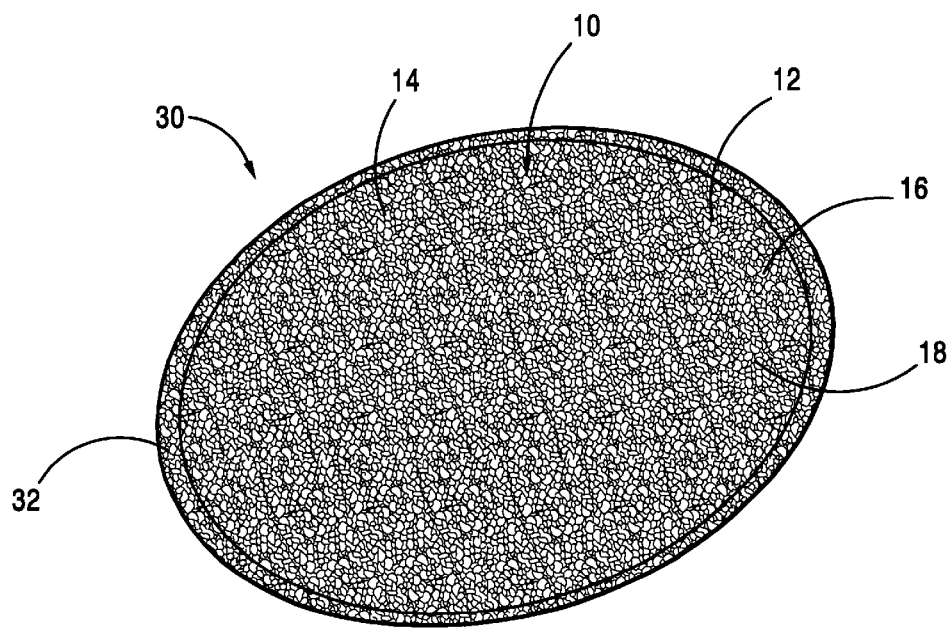
FIG. 2 is a perspective view of another vessel constructed in accordance with the present invention (from a photograph)
Figure 3:
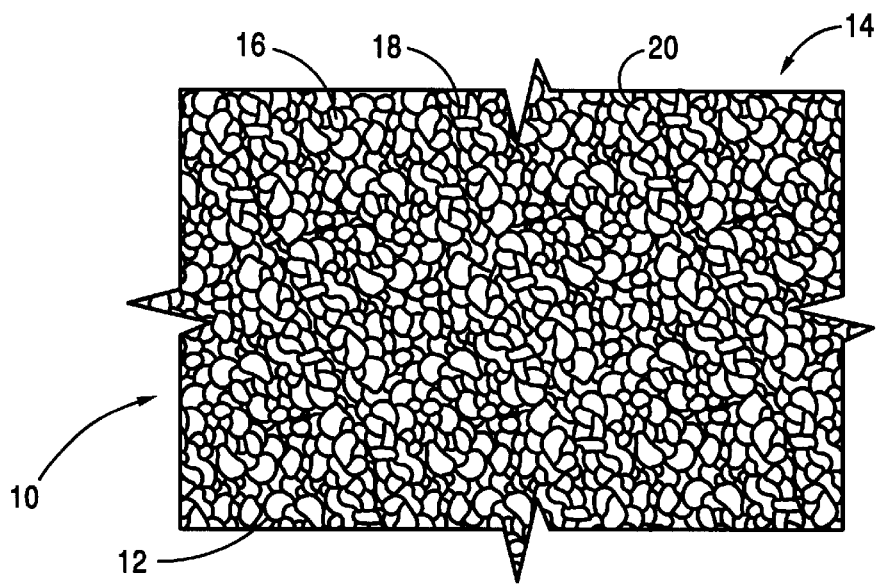
FIG. 3 is a partial view of a patterned surface of a vessel constructed in accordance with the present invention (from a photograph)
Figure 4:
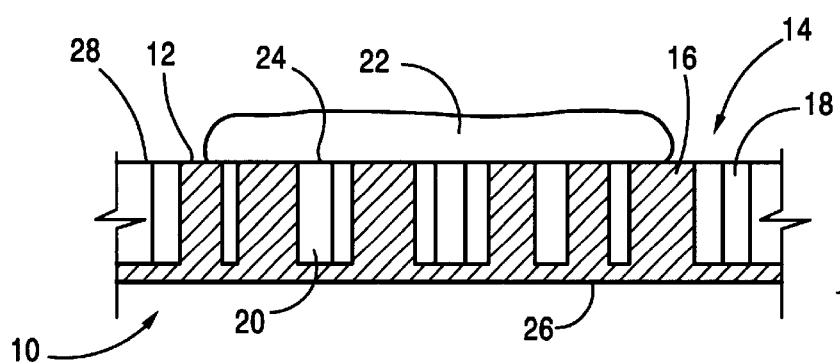
FIG. 4 is partial elevation view of a vessel of the present invention supporting an article on a patterned surface.
Figure 5:
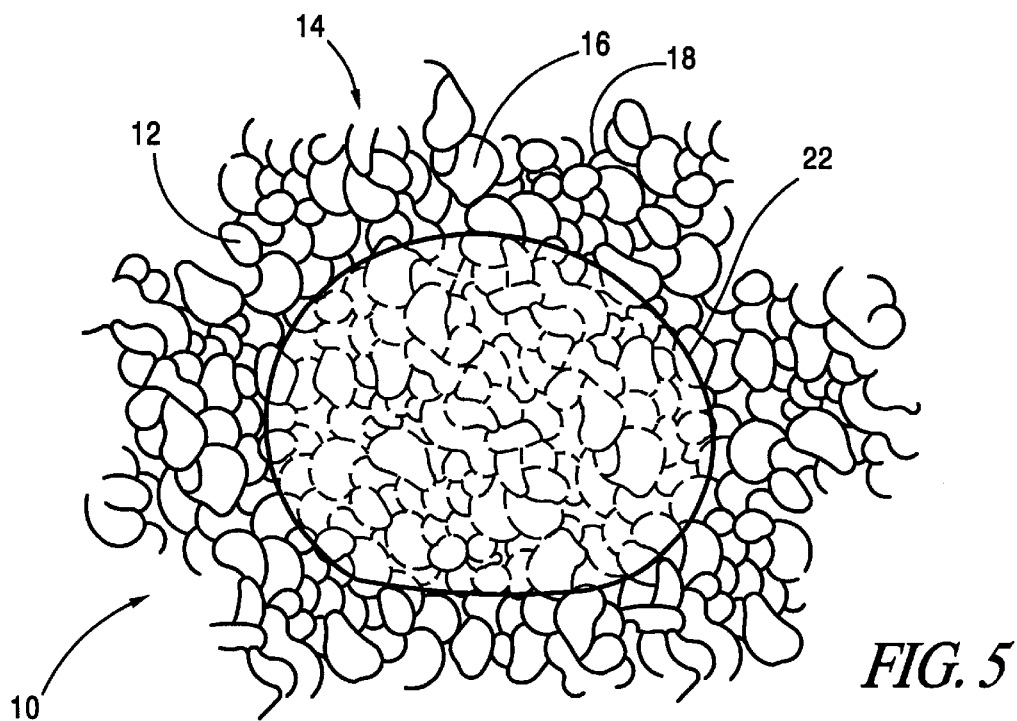
FIG. 5 is a plan view of a patterned surface of a vessel constructed in accordance with the present invention and a food product.

Referring now to the drawings there are shown preferred embodiments for the improved support surface incorporated into a support vessel of this invention that is described in connection with a baking pan or cookie sheet to provide improved baking or browning of a food product supported on the surface of the present invention. The support surface and the vessel incorporating the support surface of the present invention is particularly adapted for providing a combination of maximum heat transfer and air flow or air circulation and is characterized by raised portions and low portions provided by an embossed surface that increase the amount of the food product that is not in direct contact with the support vessel.

The drawings show the vessel 10 for supporting a food product or other article to be processed in manner that includes heat transfer that comprises a surface 12 for supporting the food product. The surface 12 includes a pattern 14 formed in or by the surface for supporting the food product.

A preferred embodiment of the pattern used with the vessel illustrated in the drawings is referred to as a pebble-grain embossed surface. The pattern comprises one or more raised portions 16 and low portions or valleys 18.

The combination of the raised portions 16 and the low portions 18 form pockets 20. These pockets provide for air flow or circulation between the vessel and a supported article 22, for example, a food product such as cookie dough or a pizza.

In operation, in connection with the food baking application previously mentioned to enhance baking and browning of the food product 22 by using the vessel 10, the food product is placed on the support surface 12 in a conventional manner, for example, placed directly on the support surface. The raised portions or surfaces 18 are in contact with the food product 22 and the predominant heat transfer takes place between the raised surface and the food product.

The low portions or areas 18 of the patterned surface are not generally in contact with the food product 22 but form the the pocket 20. The combination of the food product and the patterned surface create the pocket and air flows or circulates underneath the food product, that is, between a food product support surface 24 and the vessel 10 that is supported by an opposing surface 26 of the vessel 10.

In the example of baking the air flow is heated air while in the thawing or freezing examples, the air can have an ambient temperature or a lowered temperature, respectively. In each of the examples, the pocket that is allowed to form through the combination of the food product or other article and the patterned surface of the vessel on which it rests or is supported provide the means for allowing the cushioning of the supported article on the support surface of the vessel.

In a preferred embodiment the pattern has the appearance of a "cobblestone street" but for the fact that the upper surface 28 of the raised portions of the patterned surface are all flat and lie in the same geometric plane. It is estimated that the ratio of this flat cooking surface 28 (i.e., the "pebbles") to the low portion or valley 18 where air flows or circulates is approximately 2:1.

The aluminum sheets used to construct the vessels of the preferred embodiment are embossed with the "pebble-grain" pattern surface for cooking and baking various foods in an oven. The aluminum sheets are preferably an alloy common to the food equipment industry, for example, 3003, 3004 or 5052.

Preferred embodiments of the present invention are constructed in a variety of shapes and sizes. The current choices are an approximately 14 inch by 17 inch rectangular sheet, an approximately 14 inch by 20 inch rectangular sheet and an approximately 15.5 inch diameter circular sheet.

At the present time a circular pan 30 has a raised lip 32 at the edge. This pan is generally intended for use with foods like pizza and pies or other food that lend themselves to cooking or freezing or thawing on a round sheet. The lip 32 provides some containment for items such as pot pies or the like that could run toward the edge of the pan if they were to break open.

At the present time a rectangular pan 34 is constructed in two (2) sizes for the practical purpose of accommodating different styles and sizes of ovens The current rectangular pans have rounded, protective corners 36 or approximately 1 inch radius and each of the narrow ends 38 of the rectangular sheets are bent up at an angle of approximately 45 degrees to provide added rigidity and a graspable flange 40.

From the foregoing description those skilled in the art will appreciate that all of the objects of the present invention are realized. A vessel with an improved support surface has been shown and described for providing the air pocket between the vessel support surface and the article when the surface supports article so as to provide heat transfer between the article and the vessel.

The baking pan embodiment of the present invention is adapted to support a food product on a surface that does not trap the food product in complete direct contact with the baking pan. Therefore, use of the baking pan allows baking and browning of a food product with a reduced occurrence of burning and an enhanced capability to brown the food product.

The improved surface is adapted to have one or more raised surfaces or portions contacting a food item or other article for maximum heat transfer between the vessel surface and the food product or other article and a low area or portion or valley to form a pocket or pockets between the food product or other article. This construction allows air to flow and circulate under the surface of the food item or other article supported on the improved surface.

The cooking vessel includes a support surface that provides improved uniform cooking of food product. The cooking support surface with its air flow and circulation characteristics slows heat transfer from the vessel to the food product while other exposed portions of the food product not in contact with the support surface approach the temperature of the cooking appliance. This "air bake" method of cooking is widely thought to be an improved method of baking.

The cooking vessel support surface provides improved uniform browning of a food product. The cooking support surface of this invention has air flow and circulation characteristics that result in more uniform browning of the food product since the portion of the food product that is supported by and, thereby, resting on the patterned support surface is not "trapped" or sealed on a hot or very hot surface without any air flow or circulation. In a preferred embodiment the ratio of raised surface to low portion or valley is approximately 2:1.

The improved article support vessel that incorporates and improved support surface pattern does not need a coating and is readily cleaned after use (e.g., baking), more readily it is believed than vessels with conventional surfaces. The patterned surface of the vessel cushions the food product by providing for a flow or circulation of air between a food product and the patterned surface in such a manner that the improved support surface acts like a non-stick surface.

The improved article support vessel is constructed from a material, for example aluminum, that is durable and resists rust. This is accomplished in a preferred embodiment due to the approximately 1⅓ pounds of solid aluminum used in creating the vessel, a material that is completely immersible, will not rust and requires no special utensils since there is no surface coating applied to a preferred embodiment of the invention.

While specific embodiments have been shown and described, many variations are possible. The particular shape of the vessel including weight and dimensions may be changed as desired to suit the equipment with which it is used of the application for which it is used.

It will be understood that the use of the term pocket is not intended to be limited to a completely sealed volume between the food product and the surface of the vessel. The term pocket generally refers to an open volume or void created in the patterned surface of the vessel by the combination of the raised and low portions of the patterned surface.

The terms trapped or sealed as used herein is not intended to be limited to an airtight relationship between the food product and the supporting surface of the vessel and the air pocket. Rather, these terms refer to the generally abutting relationship that results when the food product is placed upon the patterned surface of the support surface of the vessel.

A patterned surface is within the scope of the present invention so long as the food product is supported in some fashion and complete surface to surface support is not required by the present invention. In other words, contact exists between the patterned surface and the food product supported thereon, and how much contact may vary from pattern to pattern or from one portion of a patterned surface to another portion of the same patterned surface.

The air pockets are defined as generally formed from a combination of a raised portion of the patterned surface and a low portion of the patterned surface. It should be understood that the use of the terms raised and low is relative.

As mentioned, a preferred embodiment of the present invention is formed from a sheet of metal with a "pebble-grain pattern" as used in the rolled metal industry. The invention, however, is not limited to the use of only sheet of metal with the pebble pattern surface since a new pattern could be devised that would meet the performance requirements of the invention as discussed herein.

Rather, the present invention includes a vessel with an article supporting surface patterned to provide the air pockets illustrated, described and claimed herein. The invention is not limited to any specific pattern so long as the surface pattern creates the air pockets disclosed and described and does not require a particular pattern or specific relationship between the raised portion of the patterned surface and the low portion of the patterned surface.

Having described the invention in detail, those skilled in the art will appreciate that modifications may be made of the invention without departing from its spirit. Therefore it is not intended that the scope of the invention be limited to the specific embodiments illustrated and described, rather, it is intended that the scope of this invention be determined by the appended claims and their equivalents.

What is claimed is:

1. A vessel for use during processing a food product at a temperature other than ambient temperature, the vessel including a surface for supporting the food product, the vessel and the supporting surface comprising:

a vessel for supporting the food product during processing of the food product at a temperature, wherein the temperature is not ambient temperature;

a surface of the vessel, the surface supporting the food product during processing; and a pattern located on the surface of the vessel, the pattern providing an air pocket between the vessel and the food product when the surface supports the food product, the air pocket defined by a combination of a raised portion of the surface pattern and a lower portion of the surface pattern, whereby heat transfer between the food product and the vessel is enhanced during food processing and air circulation occurs in the air pocket through a channel formed between adjacent raised portions, the surfaces of the raised portions having an irregular shape and defining a substantially planar supporting surface, the raised portion extending generally vertically from the lower portion.

2. A vessel as set forth in claim 1 wherein the vessel includes a sheet portion of the surface having the pattern located on the surface.

3. A vessel as set forth in claim 1 wherein the vessel includes a generally circular portion of the surface having the pattern located on the surface.

4. A vessel as set forth in claim 1 wherein the vessel includes a generally rectangular portion of the surface having the pattern located on the surface.

5. A vessel as set forth in claim 1 wherein the vessel includes a generally square portion of the surface having the pattern located on the surface.

6. A vessel as set forth in claim 1 wherein the ratio of the raised portion to the low portion is approximately 2:1.

7. A vessel as set forth in claim 1 wherein the raised portion has a generally flat upper surface that lies in substantially the same plane.

8. A vessel as set forth in claim 1 including a plurality of raised portions and low portions.

9. A vessel as set forth in claim 8 wherein the ratio of the raised portions to the low portions is approximately 2:1.

10. A vessel as set forth in claim 1 wherein the vessel is formed from a sheet of aluminum having a pebble-grain pattern.

11. A vessel for processing a food product at a temperature other than ambient temperature, the vessel including a surface for supporting the food product, the vessel and the supporting surface comprising:

a vessel for supporting the food product during processing of the food product at a temperature, wherein the temperature is not ambient temperature;

a surface of the vessel, the surface supporting the food product during processing; and the surface of the vessel having a pattern, the pattern providing an air pocket between the vessel and the food product when the surface supports the food product, the air pocket defined by a combination of a raised portion of the surface pattern and a lower portion of the surface pattern, whereby heat transfer between the food product and the vessel is enhanced during food processing and air circulation occurs in the air pocket through a channel formed between adjacent raised portions, the surfaces of the raised portions having an irregular shape and defining a substantially planar supporting surface, the raised portion extending generally vertically from the lower portion.

12. A vessel as set forth in claim 11 wherein the ration of the raised portion and the low portion is approximately 2:1.

13. A vessel as set forth in claim 11 wherein the raised portion has a generally flat upper surface that lies in substantially the same plane.

14. A vessel as set forth in claim 11 including a plurality of raised portions and low portions.

15. A vessel as set forth in claim 14 wherein the ratio of the raised portions to the low portions is approximately 2:1.

16. A vessel as set forth in claim 11 wherein the vessel is formed from a sheet of aluminum having a pebble-grain pattern.

17. A vessel having a surface as set forth in claim 11 wherein the vessel is a baking pan.

18. A vessel having a surface as set forth in claim 17 wherein the vessel is a substantially round baking pan.

19. A vessel having a surface as set forth in claim 17 wherein the vessel is a substantially rectangular baking pan.

20. A vessel having a surface as set forth in claim 17 wherein the vessel is a substantially square baking pan.

21. A vessel having a surface as set forth in claim 11 wherein the vessel is a cooling vessel.

22. A vessel having a surface as set forth in claim 21 wherein the vessel is a substantially round cooling vessel.

23. A vessel having a surface as set forth in claim 21 wherein the vessel is a substantially rectangular cooling vessel.

24. A vessel having a surface as set forth in claim 21 wherein the vessel is a substantially square cooling vessel.

25. A vessel having a surface as set forth in claim 11 wherein the vessel is a freezing vessel.

26. A vessel having a surface as set forth in claim 25 wherein the vessel is a substantially round freezing vessel.

27. A vessel having a surface as set forth in claim 25 wherein the vessel is a substantially rectangular freezing vessel.

28. A vessel having a surface as set forth in claim 25 wherein the vessel is a substantially square freezing vessel.

29. A vessel having a surface as set forth in claim 25 wherein the vessel is a thawing vessel.

30. A vessel having a surface as set forth in claim 11 wherein the vessel is a substantially round thawing vessel.

31. A vessel having a surface as set forth in claim 11 wherein the vessel is a substantially rectangular thawing vessel.

32. A vessel having a surface as set forth in claim 11 wherein the vessel is a substantially square thawing vessel.

* * * * *